July 2, 1940.  P. E. PERMAN  2,206,425
SAFETY VALVE
Filed Nov. 10, 1937
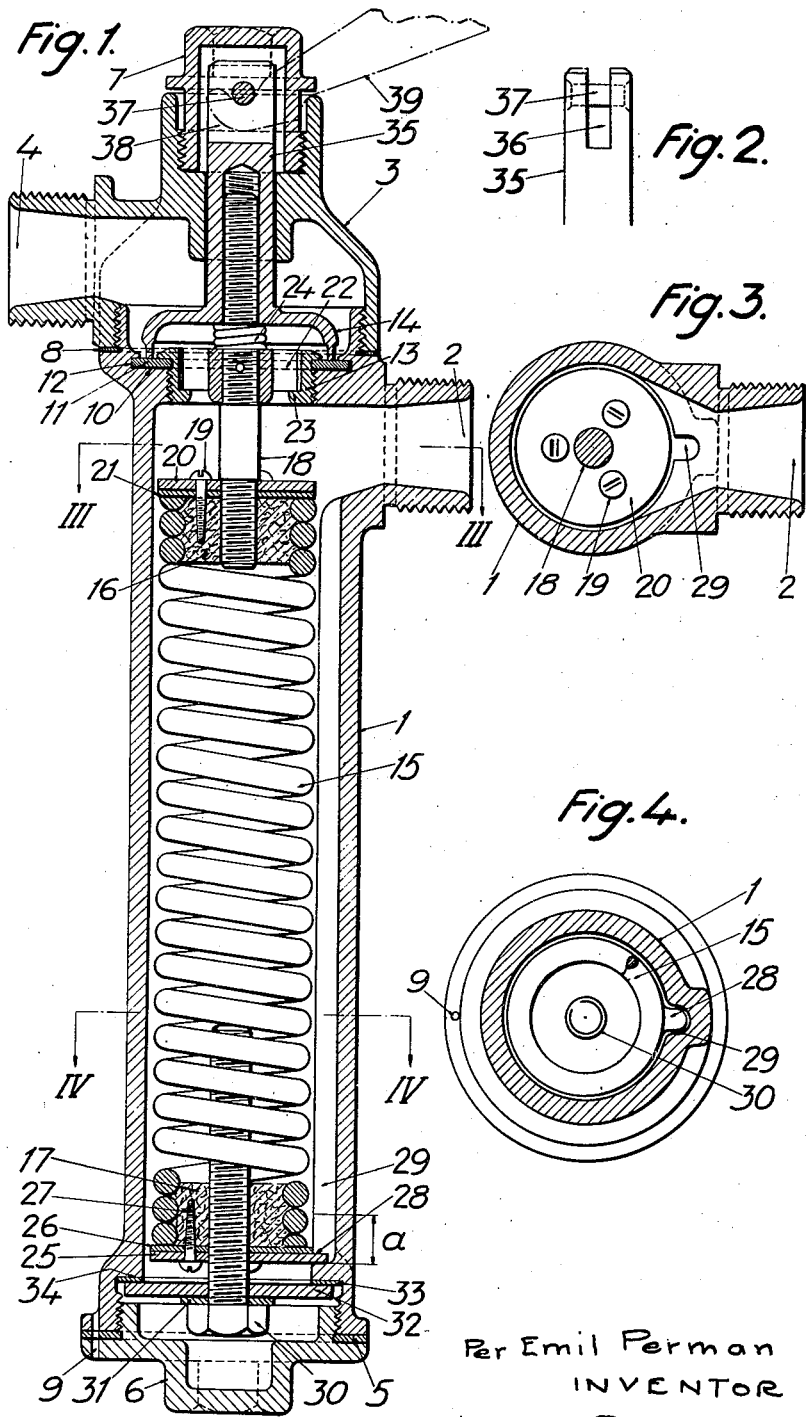
Per Emil Perman
INVENTOR Patented July 2, 1940

2,206,425

UNITED STATES PATENT OFFICE 2,206,425

SAFETY VALVE

Per Emil Perman, Stockholm, Sweden

Application November 10, 1937, Serial No. 173,830
In Sweden December 31, 1936

3 Claims. (Cl. 137—53)

This invention relates to a pressure reducing or safety valve. In order that a valve of this kind shall serve its purpose in a satisfactory manner it is required that the same opens (preferably to the same area of flow as the rest of the safety pipe) for as little overpressure as possible and, moreover, after having opened, the valve closes on as little underpressure as possible, and in spite of all this the valve shall tighten absolutely when in closed position. Of course, it is of a great importance that the valve does not lose its effectiveness after having been used for some time.

The valve construction of the present invention very well fulfills the requirements just mentioned and, provides as well for easy adjustment, easy mounting, good control possibilities et cetera, which will be more fully described in the following specification, set forth in the appended claims and illustratively exemplified in the accompanying drawing, in which Figure 1 is a longitudinal section,
Figure 2 a side view of a detail, and
Figures 3 and 4 are sections on the line III—III and IV—IV, respectively, of Figure 1.

The exterior of the valve comprises a spring or valve casing 1 is provided with an inlet 2 for the compressed fluid. Further, a valve cap 3 is attached to the upper end of the casing 1 and is provided with an outlet 4 for the same fluid. Between the inlet 2 and the outlet 4 the valve proper is, of course, positioned. The lower end of the spring casing 1 is closed by means of a bottom nut 6 provided with packing means 5, and the top of the valve cap 3 is closed by means of a top nut 7. For this nut 7 no packing means are required but between the spring casing 1 and the valve cap 3, which is screwed on to the said casing 1, there are preferably provided packing means 8. The hole 9 extending through the flanged edges of the bottom nut 6 and of the spring casing 1 is for a sealing wire and, consequently, this hole is not drilled until the valve has been adjusted in respect of pressure.

In the spring casing 1 the valve seat 10 is positioned. In the type of a valve illustrated in the drawing this seat 10 is provided with an elastic packing ring 11, the outer edge of which has been placed in a groove 12 in the spring casing 1 and the inner edge of which is squeezed tight by a clamping ring 13 screwed into the spring casing 1, the compressed fluid passing through the said ring when the valve opens. The valve body proper consists of a dome 14 the movement of which is guided in the valve cap 3.

The pressure of the compressed fluid on the valve dome 14 is transmitted to the valve spring 15, which in this case consists of a draw spring. As is clear from the above statements, the interior of the spring casing 1, through the inlet 2, is in direct communication with the pressure chamber. Consequently, the valve spring 15 will be surrounded by the compressed fluid. Opposite ends of the valve spring are provided with insulating nuts 16 and 17 screwed into the coils of the spring 15 for the purpose of avoiding electrolytic corrosion phenomena. Into the upper insulating nut 16, which is located next to the valve dome 14, the depending valve spindle 18 is screwed and by means of screws 19 through the plate 20, fixed to the spindle by welding, the plate is held in a constant angular (turned) position in relation to the insulating nut 16. An insulating plate 21 is provided between the valve spring 15 and the fixed plate 20. Further, the valve spindle 18 is provided with a wing nut 22, preferably locked by means of a pin or the like. The wings of the nut 22 cooperate with an annular shelf 23 on the clamping ring 13. Finally, the valve spindle 18 with its free upper end is screwed into the valve dome 14, which thus is adjustable along the said spindle 18. A helical spring 24 or some similar member disposed between the wing nut 22 and the valve dome 14 constitutes braking means which urge the internal thread of the dome 14 resiliently against the thread of the spindle 18 so as to prevent the valve dome 14 from changing its angular position unintentionally when the valve opens. At the opposite end of the valve spring 15 there are a stopping plate 25 and an insulating plate 26 fixed to the insulating nut 17 by means of screws 27. The stopping plate 25 is provided with an ear 28, which extends into a groove 29 in the spring casing 1 thereby making it impossible for the valve spring 15 to turn. The cap of the cap screw 30 of the valve spring 15, via a washer 31, rests against the supporting plate 32, which in turn, via a tightening ring 33, is carried by a shoulder 34 in the spring casing 1. For obtaining a comfortable mounting the cap screw 30 should be long enough to extend over the whole field of elongation of the valve spring 15 so that the said screw 30 may get a hold in the nut 17 also when the valve spring 15 is fully contracted.

In Figure 1 of the drawing the valve spring 15 is shown when in a fully elongated state, i. e. strained to bottom position. Of course, this shall not be the case under ordinary circumstances, for such spring dimension should be chosen for the valve that after the spring 15 has been strained to opening pressure a distance of, for example, 10 millimetres, is left for subsequent adjustment with respect to increased pressure, if this should be required. Of course, adjustment with respect to decreased pressure is always possible.

For the operation of the valve dome 14 from outside (after the removal of the top nut 7) the guiding spindle 35 of the said dome is, at its top, provided with a groove 36 and a shaft 37 extending transversely through the same. By means of a lever 39 (a kind of key) provided with a hook 38 the valve dome 14 may then, on one hand, be turned on the valve spindle 18, and, on the other hand, against the pressure of the valve spring 15 also be lifted from tightening contact so that the valve "blows off."

As is clear from the above description the same has reference to a certain embodiment but the ideas upon which the invention is based, and which will be hereinafter more particularly explained, may, of course, be used practically also in other embodiments. So, for example, the invention comprises also weight-loaded valves.

The most important thing in valves, particularly safety valves, is the question of tightening. Ground surfaces tighten only as long as they are entirely free from impurities. Elastic tightening packings, on the contrary, are relatively insensitive to impurities but instead have the drawback of being very soon destroyed by the pressure of the valve body. This difficulty, which heretofore has been insuperable, is avoided in a very practical manner by the arrangement for controlling the valve pressure on the tightening surfaces, which is the most characteristic feature of the present invention.

The said arrangement is founded on the following analysis. As long as a safety valve tightens there is a certain difference between the pressure exerted on the valve body in one direction of the valve load and the pressure exerted in the opposite direction on the same body by the enclosed fluid. The more the last mentioned pressure approaches to the opening pressure of the valve the less the above mentioned difference in pressure will be. Immediately before the opening of the valve this difference is slight but then the valve tightens all the same. This shows that the tightening pressure per se on the tightening surfaces, which is required for the tightening proper, may be very low. Thus, the problem of construction will then be: to unload, in tightening position, the pressure on the valve seat which exceeds the required tightening pressure, and by means of the present invention this problem has been solved in such a manner that the whole spring pressure, via the wing nut 22, has been transmitted to a stationary support, the shelf 23, and that the valve body 14 has been made adjustable along the valve spindle 18, so that, by adjustment, it may be brought into tightening contact with a certain pressure, the exceeding pressure from the valve load remaining on the shelf 23. As will be easily understood this arrangement does not at all affect the opening pressure of the valve, which is always determined only by the load of the valve. When the valve opens, the wing nut 22, of course, participates in the opening movement.

Also with respect to valves with elastic tightening packings the invention entails a very great commercial-technical advantage, viz. that valves for various pressures may be adjusted with precision in a factory and then be stored. The tightening packing of the valve being completely unloaded during such storing the same will not be damaged at all by being stored.

For valves with ground tightening surfaces the advantage of the adjustable valve body consists in the ease with which the tightening surfaces, without the valve pressure being changed, i. e. the adjustment once made, are accessible for inspection and cleaning.

As the adjustable valve body 14 should be easily accessible from outside for adjustment (in the manner hereinbefore described), the valve spring 15 may be secured directly to the lower face of the valve body 14 if a very simple construction is required. For several reasons a draw spring is of a great advantage for this purpose. If (as hereinbefore mentioned) it is electrically insulated it is also well protected in the compressed fluid.

Of course that end of the valve casing in which the spring 15 is suspended, should be accessible from outside. Therefore, the valve casing 1 is provided with side inlets 2 from the compressed fluid container, the lower end of the valve casing being completely free. As, when adjusting the spring, the bottom nut 6 must be removed, and the suspension means for the spring 15 are not adapted for complete tightening there will arise some leakage during the adjusting operation. This does not matter for the phenomenon will cease after the bottom nut 6 has been screwed on again.

Having now described my invention, what I claim as new and desire to secure by Letters Patent is:

1. In a safety valve, a valve casing having an inlet and an outlet for pressure fluid and enclosing between said inlet and outlet a stationary valve seat and a movable valve body, an axially displaceable spindle, said valve body being adjustably mounted on said spindle, means for adjusting said valve body on said spindle from the outside through an opening provided in said casing while the valve body is fully loaded, resilient means for preloading said spindle so as to urge said valve body normally onto said valve seat, an abutment on said spindle, and a stationary shoulder in said valve casing for cooperation with said abutment to take up the major part of said valve load.

2. Safety valve, as claimed in claim 1, comprising further a braking element disposed between said adjustable valve body and said abutment to prevent an unintentional displacement of the valve body relative to the spindle upon opening of the valve.

3. Safety valve, as claimed in claim 1, in which said adjusting means comprises a part of said valve body projecting through said opening in the valve casing to the outside, so that the valve body can be lifted off the valve seat by manipulating said spindle against the valve load.

PER EMIL PERMAN.